Nov. 24, 1964         D. T. JOHNSON         3,158,217
SCALE LOAD PLATFORM LOCK
Filed June 26, 1961                2 Sheets-Sheet 1

Dennis T. Johnson
INVENTOR.

BY *[signatures]*
Attorneys

Dennis T. Johnson
INVENTOR.

United States Patent Office 3,158,217
Patented Nov. 24, 1964

3,158,217
SCALE LOAD PLATFORM LOCK
Dennis T. Johnson, 1315½ N. Washington St.,
Hutchinson, Kans.
Filed June 26, 1961, Ser. No. 119,428
4 Claims. (Cl. 177—134)

This invention relates to a novel and useful scale load platform lock and more specifically to a platform lock adapted for use with scale load platforms that are utilized to weigh heavy vehicles.

A vehicle being weighed is usually driven onto the load platform of the scale and regardless of how much care is taken when driving the vehicle onto the load platform the scale platform is moved in a horizontal plane and if the vehicle to be weighed is not driven onto the scale platform with considerable care, considerable horizontal oscillation of the scale load platform will result. Any slight horizontal movement of a scale load platform while being utilized to support a heavily loaded vehicle can result in considerable undesirable wear and damage to the fulcrum pivots of the scale. If substantial horizontal movement of the scale load platform results from a heavily loaded vehicle being recklessly positioned thereon, irrepairable damage can be done to the lever system of the scale.

The scale load platform lock of the instant invention includes the provision of a socket member adapted to be rigidly secured to a wall of a scale pit in a manner in order that the socket member opens in a horizontal plane. A locking pawl is slidably mounted in a mounting frame carried by the movable load platform for movement between a first locked position seated in the socket member and a second retracted position withdrawn from engagement with the socket member. The socket member includes inwardly convergent side walls and the locking pawl is provided with a free end portion for seated engagement within the socket member which includes outwardly convergent side surfaces complementary to the side walls of the socket. In this manner, as the locking pawl is extended into seated engagement within the socket member, the scale load platform is moved to a predetermined position and locked in that position. Then, a heavily loaded vehicle may be driven onto the load platform and stopped. Then, each of the locking pawls provided may be simultaneously retracted in order that the scale mechanism may support the load platform and its load without effecting horizontal oscillatory movement of the scale load platform.

The scale load platform lock of the instant invention is designed primarily for use in pairs although more platform locks may be provided if desired.

The main object of this invention is to provide a scale load platform lock which may be utilized to move a scale load platform to a predetermined position and locked in that position prior to and during the time in which a loaded vehicle is being moved onto the load platform.

A further object of this invention, in accordance with the immediately preceding object, is to provide a scale load platform lock which may be readily used in pairs and actuated simultaneously in order to minimize any horizontal shifting of the scale load platform during the process of locking the load platform in position prior to the positioning of a loaded vehicle thereon.

A final object to be specifically enumerated herein is to provide a scale load platform lock which will conform to conventional forms of manufacture, be of simple construction and easy to operate so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
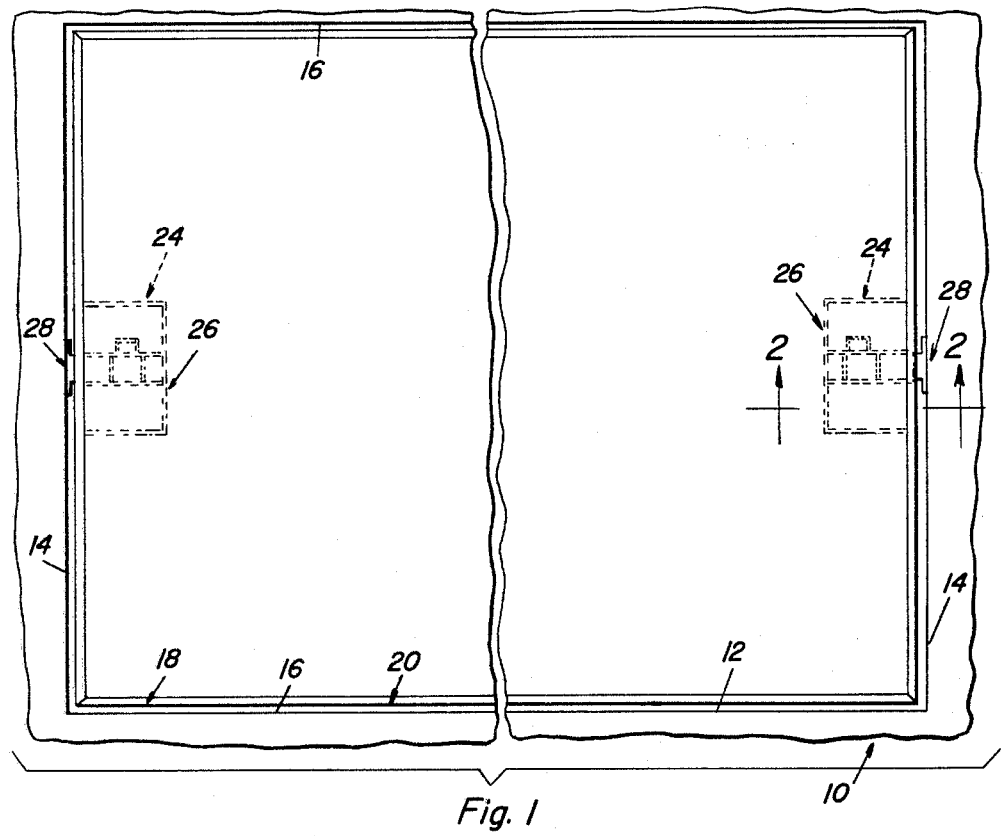
FIGURE 1 is a top plan view of a scale and its load platform which is disposed in a pit including opposite side and end walls, parts of the pit and load platform being broken away.
Figure 2:
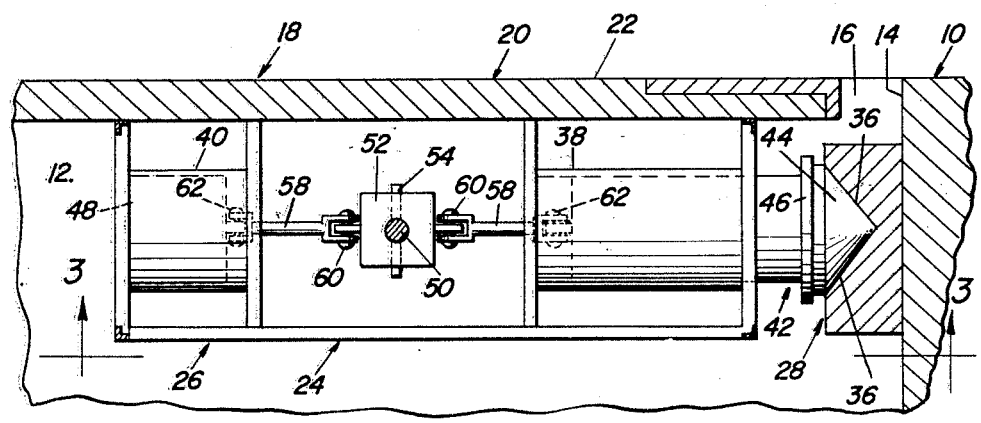
FIGURE 2 is a fragmentary enlarged longitudinal vertical sectional view taken substantially upon the plane indicated by the section line 2—2 of FIGURE 1.
Figure 3:
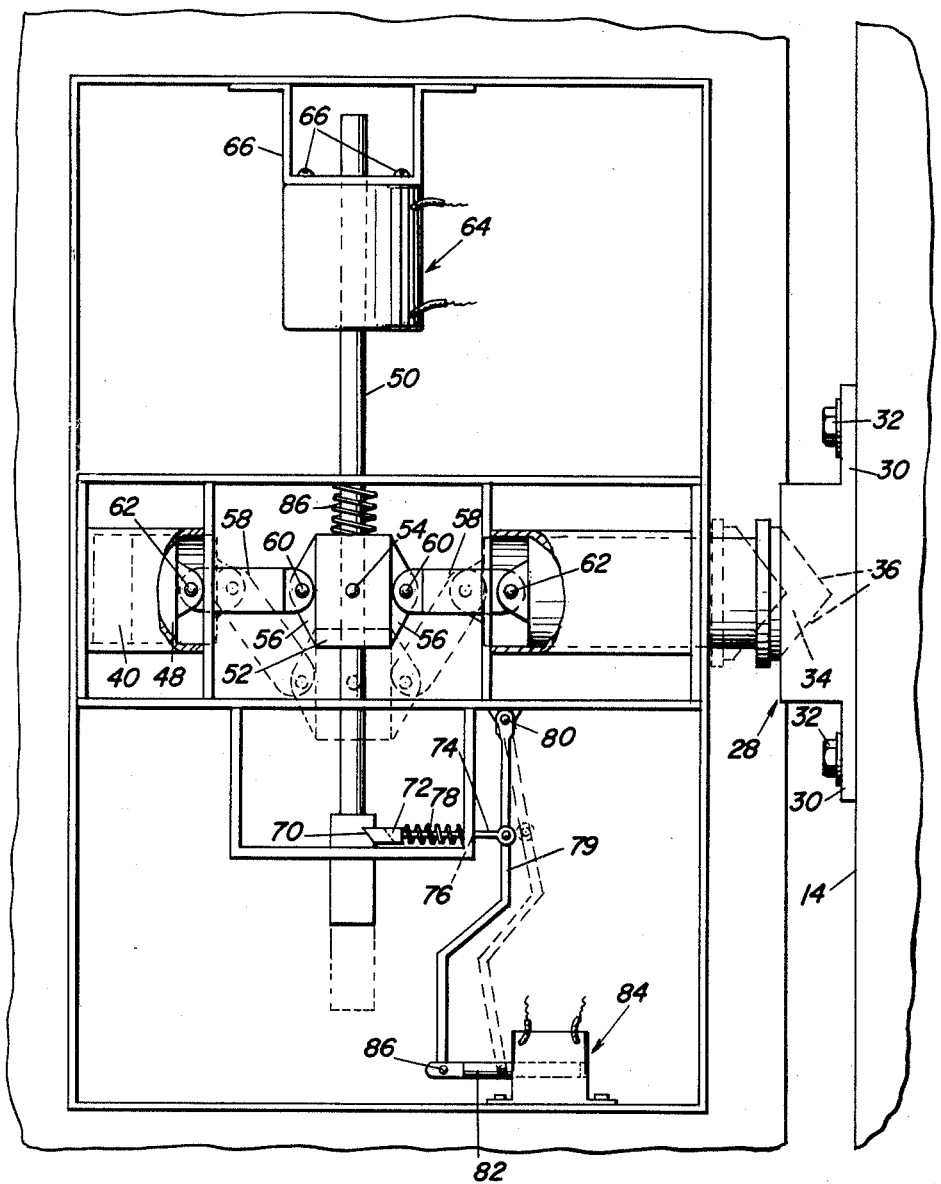
FIGURE 3 is a bottom plan view taken substantially upon the plane indicated by the section line 3—3 of FIGURE 2.

Referring now more specifically to the drawings the numeral 10 generally designates a supporting surface in which there is formed a scale pit 12 having opposite end and side walls 14 and 16 respectively. A scale assembly generally referred to by the reference numeral 18 includes a scale load platform generally referred to by the reference numeral 20 which is disposed in the pit 12 and has its upper surface 22 disposed in substantial horizontal alignment with the supporting surface 10.

The scale load platform lock is generally designated by the reference numeral 24 and includes a support frame generally referred to by the reference numeral 26 and a socket member comprising first coacting latch means generally referred to by the reference numeral 28. The socket member 28 includes apertured mounting ears 30 and suitable fasteners 32 are utilized to secure each of the socket members 28 to one of the end walls 14 of the pit 12. The socket members 28 each defines an outwardly opening socket 34 which includes inwardly convergent side walls 36. Although there are only two scale load platform locks 24 illustrated in FIGURE 1, it is to be noted that additional scale load platform locks may be provided along the opposite sides of the scale load platform 20.

Each of the support frames 26 is fixedly secured to the undersurface of the scale load platform 20 in any convenient manner and includes a pair of axially aligned sleeve members 38 and 40. The support frame 26 comprises second latch means and includes a piston-like elongated and generally cylindrical locking pawl generally referred to by the reference numeral 42 which is slidably disposed in the outer end of the sleeve 38. The free end of the locking pawl 42 is provided with a conical head 44 which is seatingly receivable in the socket 34 defined by the inwardly convergent side walls 36 and the conical head 44 which is seatingly receivable in the socket 34 defined by the inwardly convergent side walls 36 and the conical head portion 44 also includes an annular radially extending abutment flange 46 for limiting inward retraction of the locking pawl 42 upon engagement of the flange 46 with the support frame 26 and the outer end of the sleeve 38. A generally cylindrical slide member 48 is slidingly received in each of the sleeves 40 for reciprocal movement therein and an actuator shaft 50 is mounted for reciprocal movement in the support frame 26 for movement in a direction at right angles relative to the longitudinal axes of the sleeves 38 and 40. A coupler member 52 is secured on the actuator shaft 50 by means of a setscrew 54 and is disposed in alignment with the longitudinal axes of the sleeves 38 and 40. The coupling member 52 is provided with a pair of apertured ears 56 which project from opposite sides of the coupler member 52 and a pair of links 58 are pivotally connected between the apertured ears 56 and the confronting ends of the locking pawl 42 and slide member 48 by means of pivot pins 60 and 62.

One end of the actuator shaft 50 comprises the movable portion of an electric solenoid 64 which is mounted on the support frame 26 by means of a mount 66 and fasteners 68 and the other end of the actuator shaft 50 is provided with a radially opening notch 70 which is engageable by a latch element 72 carried by a latch rod 74. The latch rod 74 is slidably mounted in the support frame 26 for longitudinal reciprocal movement as at 76 and is spring-urged toward a position with the element 72 received in the notch 70 by means of a compression spring 78. The end of the rod 74 remote from the element 72 is pivotally secured to an actuating arm or lever 79 having one end pivotally secured to the support frame 24 as at 80 and the other end pivotally secured to the movable shaft 82 of an electric solenoid generally referred to by the reference numeral 84 as at 86.

In operation, the solenoid 64 is actuated in order to move the actuating shaft 50 in a direction moving the connecting member 52 toward the solenoid 64. In this position, the links 58 will extend longitudinally of the sleeves 38 and 40 and the locking pawl and slide member 42 and 48 will be disposed outermost in the sleeves 38 and 40 respectively with the locking pawl 48 disposed in seated engagement with the socket member 28. As the actuating shaft 50 is moved to extend the locking pawl 42, the element 72 is engaged with the notch 70 in order to retain the locking pawl 42 in its outermost extended locked position. Then, should it be desired to retract the locking pawl 42, the solenoid 84 is actuated whereupon the lever arm 79 will be pulled to retract the element 72 from engagement with the notch 70 whereby the compression spring 86 will return the connecting member 52 to its position furthermost from the solenoid 64 in order to effect movement of the actuating shaft 50 in a direction away from the solenoid 64 to thereby retract the locking pawl 42.

It is to be understood that each of the scale load platform locks 24 may be simultaneously operated by a single switch connected to each of the solenoids 64 and a second switch connected to the solenoids 84. In addition, if desired the slide member 48 may actually comprise one of the locking pawls 42 and be positioned a greater distance from the actuating shaft 50 and connected to the outer end of the corresponding link 58 by means of a connecting rod. In this manner, a single pair of solenoids 64 and 84 could be utilized to actuate a pair of locking pawls 42.

It is to be noted that the links 58 are substantially aligned with the longitudinal axes of the sleeves 38 and 40 when the locking pawl 42 is in the extended position. Inasmuch as the locking pawl 42 is firmly seated within the socket member 28 as the links 58 approach their aligned positions, tremendous leverage is brought to bear against the locking pawl 42 to urge the latter into still further seated engagement with the socket member 38 as the links 58 are moved to their final extended position in alignment with the longitudinal axes of the sleeves 38 and 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a scale pit having a scale load platform mounted therein for vertical movement and also limited horizontal shifting, a scale load platform lock comprising first and second coacting latch means adapted to intermittently rigidly support said scale load platform in said scale pit, one of said coacting latch means secured to said scale load platform and the other latch means secured to a wall of said scale pit, said first latch means comprising a socket member, and said second latch means comprising a support frame, a locking pawl slidably mounted in said frame for reciprocal movement between first a locked position seated in said socket member and second a retracted position withdrawn from engagement with said socket member, and means secured between said support frame and locking pawl for intermittently urging said locking pawl toward said first position, said socket member defining a conical socket having inwardly convergent side walls and said locking pawl having a conical free end portion including outwardly convergent side surfaces complementary to said socket, lock means automatically and releasably securing said locking pawl in said first position upon movement of said locking pawl to said first position, said lock means including releasable spring urged latch means engageable with said actuator upon movement of the latter in said one direction, means yieldably urging said locking pawl toward said second position, said yieldable urging means comprising spring means normally urging said actuator in the direction opposite said one direction.

2. The combination of claim 1 including an elongated actuator mounted in said main frame for longitudinal reciprocal movement in a direction extending at substantially right angles to the direction of movement of said locking pawl and slide member, link means pivotally secured between said actuator and locking pawl for effecting inverse movement of said locking pawl in response to reciprocation of said actuator, said urging means operatively connected to said actuator for effecting movement of said actuator in one direction.

3. The combination of claim 2 including release means operatively connected to said lock means for releasing the latter and enabling unrestricted movement of said actuator in said opposite direction.

4. The combination of claim 3 wherein said latch means comprises an elongated latch element mounted from said frame for reciprocal longitudinal movement transversely of the direction of movement of said elongated actuator and engageable at one end with the latter, an actuating arm pivotally secured at one end to said frame for swinging movement of the other end of said arm through the plane in which said latch element and actuator are reciprocable, the other end of said latch element being pivotally secured to the free end portion of said actuating arm, and an electric solenoid operatively connected to the free end portion of said actuating arm for intermittently retracting said latch element by pivoting the free end of said actuating arm in a direction to retract said latch element from engagement with said actuator.

References Cited in the file of this patent

UNITED STATES PATENTS

| | | |
|---|---|---|
| 2,489,957 | Davis | Nov. 29, 1949 |
| 2,686,577 | Hoppenjans | Aug. 17, 1954 |
| 2,786,701 | Povlich | Mar. 26, 1957 |
| 2,936,592 | Suderow | May 17, 1960 |